United States Patent
Abusleme et al.

(10) Patent No.: US 6,277,936 B1
(45) Date of Patent: Aug. 21, 2001

(54) PERHALOGENATED THERMOPLASTIC (CO)POLYMERS OF CHLOROTRIFLUOROETHYLENE

(75) Inventors: Julio A. Abusleme, Saronno; Claudia Manzoni, Bologna, both of (IT)

(73) Assignee: Ausimont S.p.A., Milan (IT)

( * ) Notice: Subject to any disclaimer, the term of this patent is extended or adjusted under 35 U.S.C. 154(b) by 0 days.

(21) Appl. No.: 09/612,287

(22) Filed: Jul. 7, 2000

(30) Foreign Application Priority Data

Jul. 9, 1999 (IT) .............................. MI99A1514

(51) Int. Cl.⁷ .................. C08F 16/24; C08F 116/12; C08F 216/12
(52) U.S. Cl. .................. 526/247; 526/173; 526/181; 526/209
(58) Field of Search .................. 526/247, 173, 526/181, 209

(56) References Cited

U.S. PATENT DOCUMENTS

| | | | |
|---|---|---|---|
| 4,025,709 | 5/1977 | Blaise et al. | 526/225 |
| 4,360,652 | 11/1982 | Dohany | 526/210 |
| 4,513,129 | 4/1985 | Nakagawa et al. | 526/249 |
| 4,789,717 | 12/1988 | Giannetti et al. | 526/209 |
| 4,864,006 | 9/1989 | Giannetti et al. | 526/247 |
| 5,021,516 | 6/1991 | Wheland | 525/403 |
| 5,145,925 | 9/1992 | Ihara et al. | 526/247 |
| 5,182,342 | 1/1993 | Feiring et al. | 526/206 |
| 5,453,477 | 9/1995 | Oxenrider et al. | 526/230 |
| 5,498,680 | 3/1996 | Abusleme et al. | 526/209 |
| 5,498,682 | 3/1996 | Navarrini et al. | 526/247 |
| 5,569,723 | 10/1996 | Abusleme et al. | 526/231 |

FOREIGN PATENT DOCUMENTS

| | | |
|---|---|---|
| 0 185 242 A2 | 6/1986 | (EP) . |
| 0 186 215 A2 | 7/1986 | (EP) . |
| 0 349 126 A2 | 1/1990 | (EP) . |
| 0 633 257 A1 | 1/1995 | (EP) . |
| 0 650 982 B1 | 5/1995 | (EP) . |
| 0 697 766 A1 | 2/1996 | (EP) . |
| 0 720 991 A2 | 7/1996 | (EP) . |
| 0 720 992 B1 | 7/1996 | (EP) . |
| 0 816 400 A1 | 1/1998 | (EP) . |
| 0 816 401 A1 | 1/1998 | (EP) . |

*Primary Examiner*—Kriellion Sanders
(74) *Attorney, Agent, or Firm*—Arent Fox Kintner Plotkin & Kahn, PLLC

(57) ABSTRACT

Chlorotrifluoroethylene (CTFE) thermoplastic copolymers, comprising:

(a) from 0.15 to 4% by moles of one or more fluorodioxoles having the general formula:

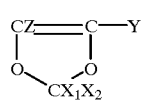

(I)

wherein:

$X_1$ and $X_2$, equal to or different from each other, are selected among —F or —$CF_3$;

Z is selected among —F, —H, —Cl;

Y is equal to $OR_f$ and $R_f$ is a perfluoroalkyl having from 1 to 5 carbon atoms, or Y=Z;

(b) CTFE, forming the remaining part to 100% by moles.

16 Claims, No Drawings

PERHALOGENATED THERMOPLASTIC (CO)POLYMERS OF CHLOROTRIFLUOROETHYLENE

The present invention relates to thermoplastic perhalogenated polymers having improved mechanical properties.

Specifically the present invention relates to chlorotrifluoroethylene (CTFE) thermoplastic copolymers having improved mechanical properties, specifically stress at break, in comparison with the CTFE (PCTFE) homopolymer at low and high temperatures.

The polymers of the invention are used for obtaining pipes, sheets, films and molded articles having the above mentioned characteristics.

It is known in the prior art that PCTFE is a fluorinated resin having excellent chemical resistance with good impermeability properties to gases and vapours, more specifically to oxygen, nitrogen and water vapor. However, the PCTFE has mechanical properties typical of a brittle material, i.e. high values of elastic modulus and yield stress combined with low values of stress and strain at break at room temperature and at high temperature. As known the PCTFE polymers having a high molecular weight show better mechanical properties than those having a low molten polymer viscosity. However the use of PCTFE having a very high viscosity is difficult in the fluorinated thermoplastic processing for obtaining pipes, sheets, films and molded articles.

U.S. Pat. No. 5,145,925 describes a CTFE copolymer with a perfluoroalkylvinylether in the range 0.01 and 1% by moles; the preferred comonomer is perfluoropropylvinylether (FPVE). The exemplified FPVE/CTFE copolymers all show, both those having a low content (0.05% by moles) and a high content (1.1% by moles) of modifying agent, stresses at break lower than those of the homopolymer.

In U.S. Pat. No. 5,498,682 in the name of the Applicant tetrafluoroethylene (TFE) and fluorodioxoles in general, and in particular TFE copolymers with 2,2,4-trifluoro-5-trifluoromethoxy-1,3-dioxole (TTD), are described and exemplified.

In EP 720,992 in the name of the Applicant TFE copolymers with fluorodioxoles or FPVE are exemplified. In Tables 1 and 2 of such patent the mechanical properties (stresses at break), at low and high temperature, of the TFE copolymers with TTD are similar or lower than those of the TFE copolymers with FPVE.

Therefore, the need was felt to have available a thermoplastic PCTFE with the homopolymer intrinsic characteristics (chemical resistance and impermeability) combined with good mechanical properties leading to a non-brittle PCTFE at room and high temperatures. Therefore a PCTFE showing in particular improved stresses at break, combined with acceptable deformations, in comparison with those of the homopolymer and without substantially jeopardizing the yield sress.

The Applicant has unexpectedly and surprisingly found that by the use of particular comonomers as hereinunder specified it is possible to obtain a non-brittle CTFE thermoplastic copolymers at room and at high temperatures with an optimal combination of mechanical properties characterized by higher stresses at break than those of the homopolymer. Therefore an object of the present invention are chlorotrifluoroethylene (CTFE) thermoplastic copolymers, comprising:

(a) from 0.15 to 4% by moles, preferably from 0.2 to 3% by moles, still more preferably from 0.2 to 2% by moles of one or more fluorodioxoles having the general formula:

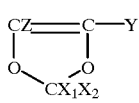

(I)

wherein:
X$_1$ and X$_2$, equal to or different from each other, are selected among —F or —CF$_3$;
Z is selected among —F, —H, —Cl;
Y is equal to OR$_f$ and R$_f$ is a perfluoroalkyl having from 1 to 5 carbon atoms, or Y=Z;

(b) CTFE, being the remaining part to 100% by moles.

Preferred fluorodioxoles of formula (I) are those wherein X$_1$, X$_2$ and Z are —F; Y is equal to OR$_f$ and R$_f$ is selected from —CF$_3$, —C$_2$F$_5$, or C$_3$F$_7$.

The fluorodioxole of formula (I) wherein X$_1$, X$_2$ and Z are —F and Y is equal to OR$_f$ and R$_f$ is —CF$_3$ i.e. the fluorodioxole 2,2,4-trifluoro-5-trifluoromethoxy-1,3-dioxole, hereinafter mentioned as TTD, is particularly preferred.

The preferred fluorodioxoles are described in USP 5,498,682 in the name of the Applicant, herein incorporated by reference.

The copolymers of the invention can optionally contain one or more perhalogenated monomers, preferably having at least three carbon atoms, provided that the thermoplastic properties are maintained and the above mentioned mechanical properties are not jeopardized. The total amount of the optional monomers is generally in the range 0.01–4% by moles, preferably the sum of the monomers different from CTFE is in the range 0.15–4% by moles.

As optional monomers, perfluoroalkylvinylethers, for example perfluoromethylvinylether, perfluoroethylvinylether, perfluoropropylvinylether, hexafluoropropene (HFP), etc., can be mentioned.

The copolymers of the invention are CTFE termoplastic copolymers having a viscosity defined by the Melt Flow Index (MFI) measurement at 265° C. and at 10 kg load according to the ASTM D 1238-88, not lower than 0.1 g/10'.

The copolymers of the invention can be prepared according to known methods, by copolymerization of the corresponding monomers, in suspension in organic medium or in water, or in aqueous emulsion, in the presence of a suitable radical initiator, at a temperature generally in the range –20° C. –150° C., preferably 0° C. –100° C., more preferably 10° C. –60° C. The reaction pressure is generally in the range 1.5–80 bar, preferably 3–37 bar, still more preferably 4–26 bar.

As initiator any compound able to generate active radicals in the polymerization system can be used. In particular the initiators, can be selected from:

(i) bis-acylperoxides of formula (R$_f$—CO—O)$_2$ wherein R$_f$ is a (per)haloalkyl C$_1$-C$_{10}$(see for example EP 185,242 and USP 4,513,129), or a perfluoropolyoxyalkylene group (see for example EP 186,215 and U.S. Pat. No. 5,021,516); among them, bis-trichloroacetylperoxide and bis-dichlorofluoroacetylperoxide (see U.S. Pat. No. 5,569,728), are particularly preferred;

(ii) inorganic peroxides soluble in water, such as monovalent cation persulphates or perphosphates; sodium and potassium persulphates are particularly preferred;

(iii) organic or inorganic redox systems, such as potassium persulphate/sodium sulphite, terbutylhydroperoxide/methabisulphite (see U.S. Pat. No. 5,453,477).

In the case of the suspension copolymerization, the reaction medium is constituted by an organic phase, to which water is sometimes added in order to favour the heat dispersion which develops during the reaction. The organic phase can be constituted by the monomers themselves, without addition of solvents, or by the monomers dissolved in a suitable organic solvent. As organic solvents chlorofluoro-carbons, such as $CCl_2F_2$ (CFC-12), $CCl_3F$ (CFC-11), $CCl_2FCClF_2$ (CFC-113), $CClF_2CClF_2$ (CFC-114), etc. are conventionally used. Alternative ozone-friendly solvents, containing only carbon, fluorine, hydrogen, and optionally oxygen, described in USP 5,182,342, can be used. In particular fluoropolyethers with at least one hydrogenated end group, preferably two, of the $—CF_2H$, $—CF_2CF_2H$, $—CF(CF_3)H$ type, can be used.

The amount of radical initiator is the standard one for the copolymerization of fluorinated monomers, and is generally in the 0.003%–10% by weight range with respect to the total amount of (co)polymerized monomers.

In the case of emulsion polymerization the reaction is carried out in the presence of a suitable surfactant, see for example those described in U.S. Pat. No. 4,360,652 and U.S. Pat. No. 4,025,709. Fluorinated surfactants are generally selected among the products of general formula:

$$R_f\text{-}X^-M^+$$

wherein $R_f$ is a $C_5$–$C_{14}$ (per)fluoroalkyl chain or a (per)fluoropolyoxyalkylene chain, $X^-$ is $—COO^-$ or $—SO_3^-$, $M^+$ is selected from: $H^+$ and alkaline metal ions. Among those commonly used: sodium perfluoro-octanoate; (per)fluoropoly-oxyalkylenes ended with one or more carboxylic groups; sulphonic acid salts of formula $R_f$—$C_2H_4SO_3H$, wherein $R_f$ is a $C_4$–$C_{10}$ perfluoroalkyl (see U.S. Pat. No. 4,025,709); etc.

Preferred surfactants are those wherein $M^+$ is $Na^+$ and $K^+$, preferably $K^+$, combined with inorganic initiators of sodium and potassium, preferably potassium, leading to non-discolored polymers.

The control of the molecular weight of the fluorinated polymers of the invention is achieved by a suitable dosage of the radical initiator in polymerization and the selection of the synthesis temperature. To obtain the polymers of the invention having high molecular weight a low synthesis temperature (10° C. –30° C.) combined with a low concentration of free radicals coming from the initiator, is preferred; viceversa to obtain low molecular weight polymers a high synthesis temperature (60° C. –80° C.) combined with a high concentration of free radicals coming from the initiator, is preferred.

When chain transfer agents are used, these can be halogenated hydrocarbons, for example chloroform or HCFC 123 and ethane or methane. The transfer agent is fed into the reactor at the beginning of the reaction, or in a continuous way or in discrete amounts during the polymerization. The chain transfer agent amount can range within rather wide limits, depending on the reaction temperature and the molecular weight target. Generally, such amount ranges from 0.001 to 5% by weight, preferably from 0.05 to 1% by weight, with respect to the total amount of monomers fed to reactor.

The process object of the present invention can be advantageously carried out in the presence of perfluoropolyoxyalkylene dispersions, emulsions or microemulsions, according to U.S. Pat. No. 4,789,717 and U.S. Pat. No. 4,864,006, or also of fluoropolyoxyalkylene microemulsions having hydrogenated end groups and/or hydrogenated repeating units, according to U.S. Pat. No. 5,498,680.

The polymerization can also be carried out by using a radical photoinitiator in the presence of visible-ultraviolet radiation, either in suspension in organic medium or in water or in emulsion/microemulsion, according to EP 650,982 and EP 697,766 in the name of the Applicant, herein incorporated by reference.

Thermally stable photoinitiators at the polymerization temperature and at room temperature are preferred. Potassium persulphate or sodium persulphate are particularly preferred.

The preferred process of the invention is carried out in microemulsion of (per)fluoropolyoxyalkylene, wherein the surfactant is a sodium or potassium salt, preferably potassium, in presence of an inorganic initiator of sodium or potassium, preferably potassium persulphate.

The second melting temperature ($T_{2f}$) and the crystallization temperature ($T_{xx}$) are determined by differential scanning calorimetry (DSC).

The monomer composition has been determined by $^{19}$F-NMR.

The mechanical properties on compression-molded samples according to ASTM D 1708, are reported in Table 1.

The discoloration is determined through the observation of the strands obtained after 20, 40 and 60 minutes of residence time of the molten polymer in the MFI machine at 265° C. A non-discolored polymer is white or transparent without color. Discolored polymers are generally yellow or brown. The skilled in the art can also measure the discoloration by measuring the white and/or yellow indexes.

The following examples are given for illustrative purposes and are not limitative of the present invention.

EXAMPLE 1

On a 2 l AISI 316 autoclave side wall, equipped with stirrer working at 400 rpm, a quartz window has been inserted, in correspondence of which a Hanau® TQ-150 type UV lamp has been placed. It is a high pressure mercury lamp which emits radiations in the range 240–600 nm, with a 13.2 W power for the radiation in the 240–330 nm range.

The autoclave has been evacuated and therein were introduced in sequence:

1200 g of demineralized $H_2O$;

14 g of a microemulsion formed by: 20% by weight of Galden® D02, having the formula:

$$CF_3O—(CF_2CF(CF_3)O)_m(CF_2O)_n—CF_3$$

having m/n=20 and average molecular weight of 450; 40% by weight of a surfactant having the formula:

$$(C_3ClF_6O)—(CF_2CF(CF_3)O)_{m1}—(CF_2O)_{n1}—CF_2COO^-K^+$$

having m1/n1=82.7 and average molecular weight of 527; the remaining part being formed by $H_2O$;

3.0 g of potassium persulphate dissolved in 200 g of demineralized $H_2O$.

In the autoclave being at 1°–5° C. 10 g of TTD and 300 g of CTFE were then introduced. Then the autoclave was heated to the reaction temperature of 20° C. The UV lamp was then switched on. After 12 hours of reaction the lamp was switched off and the autoclave vented and discharged at room temperature.

The latex discharged from the autoclave, having a concentration of 167 g/l of water, was cryogenically coagulated. Then the polymer was separated and dried at 150° C. for about 16 hours.

The characteristics of the obtained polymer and the mechanical properties at room temperature and at high temperatures, are reported in Table 1.

EXAMPLE 2

Example 1 has been repeated except that 5 g of TTD have been fed into the autoclave.

After 6 hours of reaction a latex having a concentration of 190 g/l of water has been obtained.

The characteristics of the obtained polymer and the mechanical properties at room temperature and at high temperatures, are reported in Table 1.

EXAMPLE 3

Example 1 has been repeated except that 39.5 g of TTD have been fed into the autoclave.

After 10.5 hours of reaction a latex having a concentration of 127 g/l of water has been obtained.

The characteristics of the obtained polymer and the mechanical properties at room temperature and at high temperatures, are reported in Table 1.

EXAMPLE 4

The same autoclave of Example 1 has been evacuated and therein were introduced in sequence:

1200 g of demineralized $H_2O$;

14 g of a microemulsion formed by: 20% by weight of Galden® D02, having the formula:

$CF_3-(CF_2CF(CF_3)O)_m CF_2O)_n-CF_3$ having m/n=20 and average molecular weight of 450; 40% by weight of a surfactant having the formula:

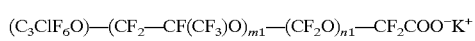

$(C_3ClF_6O)-(CF_2-CF(CF_3)O)_{m1}-(CF_2O)_{n1}-CF_2COO^-K^+$ having m1/n1=82.7 and average molecular weight of 527; the remaining part being formed by $H_2O$;

3.0 g of potassium persulphate dissolved in 200 g of demineralized $H_2O$.

In the autoclave being at 1°–5°C. 10 g of TTD and 300 g of CTFE were then introduced. Then the autoclave was heated to the reaction temperature of 50° C. After 8.5 hours of reaction the autoclave is vented and discharged at room temperature.

The latex discharged from the autoclave, having a concentration of 216 g/l of water, was cryogenically coagulated. Then the polymer was separated and dried at 150° C. for about 16 hours.

The characteristics of the obtained polymer and the mechanical properties at room temperature and at high temperatures, are reported in Table 1.

Discoloration of the srands obtained after 60 minutes residence time in the MFI machine at 265° C. was not observed.

EXAMPLE 5 (comparative)

Example 1 has been repeated without feeding TTD in the autoclave.

After 8 hours of reaction a latex having a concentration of 207 g/l of water has been obtained.

The characteristics of the obtained polymer and the mechanical properties at room temperature are reported in Table 1.

EXAMPLE 6 (comparative)

In a 18 l enamelled autoclave equipped with baffles and stirrer working at 450 rpm, 5 l of demineralized water and 8 kg of chlorotrifluoroethylene (CTFE) were introduced. Then the autoclave was heated to the reaction temperature of 20° C. corresponding to an initial pressure of 6 absolute bar. In the autoclave the radical initiator under the form of a trichloroacetylperoxide (TCAP) solution in CFC-113, maintained at −17° C., having a titre equal to 0.11 g TCAP/ml, was then fed in a continuous way with a flow-rate of 6 ml/h during the polymerization (9 hours).

The product discharged from the autoclave was dried at 120° C. for about 16 hours. The amount of dry polymer was 550 g.

The characteristics of the obtained polymer and the mechanical properties at room temperature and at high temperatures are reported in Table 1.

EXAMPLE 7 (comparative)

Example 6 has been repeated except that in the autoclave the radical initiator under the form of a trichloroacetylperoxide (TCAP) solution in CFC-113, maintained at −17° C., having a titre equal to 0.09 g TCAP/ml, was fed in a continuous way with a flow-rate of 22 ml/h during the polymerization (9 hours).

The product discharged from the autoclave was dried at 120° C. for about 16 hours. The amount of the polymer was 940 g.

The characteristics of the obtained polymer and the mechanical properties at room temperature and at high temperatures are reported in Table 1.

EXAMPLE 8 (comparative)

Example 6 has been repeated except that in the autoclave the radical initiator under the form of a trichloroacetylperoxide (TCAP) solution in CFC-113, maintained at −17° C., having a titre equal to 0.11 g TCAP/ml, was fed in a continuous way with a flow-rate of 32 ml/h during the polymerization (9 hours).

The product discharged from the autoclave was dried at 120° C. for about 16 hours. The amount of dry polymer was 1301 g.

The characteristics of the obtained polymer and the mechanical properties at room temperature and at high temperatures are reported in Table 1.

The comparison of the invention copolymers with those of the prior art must be made at equal MFI values. Indeed, as it can be noticed in Table 1, considering the CTFE homopolymers (comparative Examples 5–8), the mechanical properties remarkably worsen as MFI increases.

The copolymers of the present invention all have stresses at break clearly better than the CTFE homopolymers maintaining an optimal global set of the other mechanical properties. Indeed, the copolymer of the invention described in Example 1 has a higher stress at break than the PCTFE homopolymer, of the comparative Example 6, although the MFI is higher than the PCTFE homopolymer.

TABLE 1

| EXAMPLE | 1 | 2 | 3 | 4 | 5(*) | 6(*) | 7(*) | 8(*) |
|---|---|---|---|---|---|---|---|---|
| TTD (% by moles) | 0.4 | 0.2 | 1.8 | 0.3 | — | — | — | — |
| MFI (g/10') | 0.85 | 0.67 | 0.5 | 5.0 | 0.6 | 0.3 | 3.4 | 7.7 |
| $T_{2f}$ (° C.) | 202.7 | 206.4 | 173.6 | 204.2 | 213.0 | 213.2 | 213.4 | 213.3 |
| $T_{xx}$ (° C.) | 166.2 | 170.5 | 120.8 | 168.3 | 170.0 | 169.6 | 170.5 | 177.9 |
| Mechanical properties at 23° C. | | | | | | | | |
| Elastic modulus (MPa) | 1221 | 1196 | 1162 | 1317 | 1224 | 1334 | 1550 | 1331 |
| Yield stress (MPa) | 37.5 | 42.3 | 32.2 | 41 | 41.4 | 42.1 | 43.8 | 45.1 |
| Yield strain (%) | 7.5 | 6.7 | 6 | 7 | 7 | — | — | — |
| Stress at break (MPa) | 42 | 39.6 | 37.8 | 39 | 33.7 | 34.3 | 29.2 | 24.8 |
| Strain at break (%) | 142 | 151 | 114 | 160 | 127 | 127 | 65.3 | 40 |
| Mechanical properties at 150° C. | | | | | | | | |
| Elastic modulus (MPa) | 22 | 49.5 | 3.7 | 46 | — | 62 | 66 | 103 |
| Yield stress (MPa) | 2.5 | 3.1 | 1 | 3 | | 3.1 | 3 | 3.7 |
| Yield strain (%) | 46 | 25 | 24 | 20 | | 34 | 28 | 8 |
| Stress at break (MPa) | 7.9 | 3.8 | 8 | 2.9 | | 3.7 | 2.7 | 2.6 |
| Strain at break (%) | 789 | 728 | 807 | 550 | | 909 | 667 | 130 |
| Mechanical properties at 175° C. | | | | | | | | |
| Elastic modulus (MPa) | 13.6 | — | — | 34.4 | — | 39.8 | — | — |
| Yield stress (MPa) | 1.9 | | | 1.8 | | 2.3 | | |
| Yield strain (%) | 48 | | | 21 | | 38 | | |
| Stress at break (MPa) | 3.4 | | | 1.6 | | 2.3 | | |
| Strain at break (%) | 737 | | | 200 | | 573 | | |

(*)comparative

What is claimed is:

1. Chlorotrifluoroethylene (CTFE) thermoplastic copolymers, comprising:
    (a) from 0.15 to 4 mole percent of one or more fluorodioxoles having the general formula:

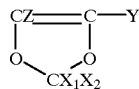

(I)

wherein:
   $X_1$ and $X_2$, equal to or different from each other, are selected among —F or —$CF_3$;
   Z is selected among —F, —H, —Cl;
   Y is equal to $OR_f$ and $R_f$ is a perfluoroalkyl having from 1 to 5 carbon atoms, or Y=Z;
    (b) chlorotrifluoroethylene (CTFE), forming the reminder of 100 molar %.

2. Chlorotrifluoroethylene (CTFE) thermoplastic copolymers according to claim 1, wherein the component (a) ranges from 0.2 to 3% by moles.

3. Chlorotrifluoroethylene (CTFE) thermoplastic copolymers according to claim 2, wherein the component (a) ranges from 0.2 to 2% by moles.

4. Chlorotrifluoroethylene (CTFE) thermoplastic copolymers according to claim 1, wherein in the component (a) $X_1$, $X_2$ and Z are —F; Y is equal to $OR_f$ and $R_f$ is selected among —$CF_3$, —$C_2F_5$ or $C_3F_7$.

5. Chlorotrifluoroethylene (CTFE) thermoplastic copolymers according to claim 1, wherein the component (a) is 2,2,4-trifluoro-5-trifluoromethoxy-1,3-dioxole.

6. A process for preparing chlorotrifluoroethylene (CTFE) thermoplastic copolymers according to claim 1 wherein the copolymers are prepared by copolymerization of the corresponding monomers, in suspension in organic medium or in water or in aqueous emulsion in the presence of a suitable radical initiator at a temperature in the range −20° C.–150° C. and a pressure in the range 1.5–80 bar.

7. A process for preparing chlorotrifluoroethylene (CTFE) thermoplastic copolymers according to claim 6 wherein the temperature ranges from 0° C. to 100° C. and the pressure from 3 to 37 bar.

8. A process for preparing chlorotrifluoroethylene (CTFE) thermoplastic copolymers according to claim 7 wherein the temperature ranges from 10° C. to 60° C. and the pressure from 4 to 26 bar.

9. A process for preparing chlorotrifluoroethylene (CTFE) thermoplastic copolymers according to claim 6 wherein the initiator is selected among those able to generate active radicals at the selected (co)polymerization system.

10. A process for preparing chlorotrifluoroethylene (CTFE) thermoplastic copolymers according to claim 6 wherein the copolymerization is carried out in emulsion in the presence of a surfactant.

11. A process for preparing chlorotrifluoroethylene (CTFE) thermoplastic copolymers according to claim 10 wherein the surfactant is selected from among fluorinated surfactants having the general formula

wherein $R_f$ is a $C_5$–$C_{14}$ (per)fluoroalkyl chain or a (per)fluoropolyoxyalkylene chain, $X^−$ is —$COO^−$ or —$SO_3^−$, $M^+$ is selected from: $H^+$, and alkaline metal ions.

12. A process for preparing chlorotrifluoroethylene (CTFE) thermoplastic copolymers according to claim 6 wherein the process is carried out in the presence of dispersions, emulsions or microemulsions of perfluoropolyoxyalkylenes or fluoropolyoxyalkylenes having hydrogenated end groups and/or hydrogenated repeating units.

13. A process for preparing chlorotrifluoroethylene (CTFE) thermoplastic copolymers according to claim 6 wherein the process is carried out by using a radical photoinitiator in the presence of visible ultraviolet radiation.

14. A process according to claim 10 wherein the surfactant is a sodium or potassium salt, preferably potassium, in presence of an inorganic initiator of sodium or potassium, preferably potassium persulphate.

15. A method of obtaining non-brittle chlorotrifluoroethylene thermoplastic copolymers used to form pipes, sheets, films, and molded articles comprising copolymerizing monomer (a) and monomer (b) of claim 1 in the presence of a radical initiator.

16. Manufactured pipes, sheets, films, and molded articles comprised of non-brittle chlorotrifluoroethylene thermoplastic copolymers comprising the copolymers of claim 1.

* * * * *